(12) United States Patent
Takase

(10) Patent No.: US 11,420,195 B2
(45) Date of Patent: Aug. 23, 2022

(54) HONEYCOMB STRUCTURE

(71) Applicant: NGK INSULATORS, LTD., Nagoya (JP)

(72) Inventor: Naoya Takase, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 782 days.

(21) Appl. No.: 16/298,137

(22) Filed: Mar. 11, 2019

(65) Prior Publication Data

US 2019/0299200 A1    Oct. 3, 2019

(30) Foreign Application Priority Data

Mar. 28, 2018   (JP) .............................. JP2018-063062

(51) Int. Cl.

| | |
|---|---|
| *B01D 46/24* | (2006.01) |
| *B01J 35/04* | (2006.01) |
| *B01J 31/06* | (2006.01) |
| *B01J 21/06* | (2006.01) |
| *B01J 37/00* | (2006.01) |
| *B01J 37/34* | (2006.01) |
| *H05B 3/03* | (2006.01) |
| *B01J 37/12* | (2006.01) |

(Continued)

(52) U.S. Cl.
CPC .............. *B01J 35/04* (2013.01); *B01D 53/94* (2013.01); *B01J 21/06* (2013.01); *B01J 31/061* (2013.01); *B01J 37/0018* (2013.01); *B01J 37/08* (2013.01); *B01J 37/12* (2013.01); *B01J 37/342* (2013.01); *F02D 41/0255* (2013.01); *F02D 41/064* (2013.01); *H05B 3/03* (2013.01); *B01D 46/2418* (2013.01)

(58) Field of Classification Search
None
See application file for complete search history.

(56) References Cited

U.S. PATENT DOCUMENTS

| | | |
|---|---|---|
| 2014/0011664 A1 | 1/2014 | Furukawa et al. |
| 2014/0294687 A1 | 10/2014 | Mase et al. |
| 2015/0030510 A1 | 1/2015 | Mase et al. |

FOREIGN PATENT DOCUMENTS

| | | |
|---|---|---|
| JP | 2011-099405 A1 | 5/2011 |
| JP | 2014-198321 A1 | 10/2014 |

(Continued)

OTHER PUBLICATIONS

Japanese Office Action (Application No. 2018-063062) dated Aug. 31, 2021 (with English translation).

*Primary Examiner* — Mary I Omori
(74) *Attorney, Agent, or Firm* — Burr & Brown, PLLC

(57) ABSTRACT

A honeycomb structure including a honeycomb portion having porous partition walls extending from an inflow end face to an outflow end face to define cells forming through channels, an outermost peripheral wall, and a pair of electrode portions disposed on a side surface of the honeycomb portion. The electrode portions are formed in a strip shape extending in a direction of the cells. In a cross section orthogonal to the extending direction, one electrode portion of the pair of electrode portions is disposed on a side opposed to the other electrode portion across a center of the honeycomb structure portion. The honeycomb structure portion includes end regions near the pair of electrode portions and a central region excluding the end regions. An average electric resistivity A of a material forming the end regions is lower than an average electric resistivity B of a material forming the central region.

5 Claims, 6 Drawing Sheets

(51) Int. Cl.
*B01D 53/94* (2006.01)
*F02D 41/06* (2006.01)
*F02D 41/02* (2006.01)
*B01J 37/08* (2006.01)

(56) References Cited

FOREIGN PATENT DOCUMENTS

| | | |
|---|---|---|
| WO | 2012/132837 A1 | 10/2012 |
| WO | 2013/146955 A1 | 10/2013 |

[FIG. 2]
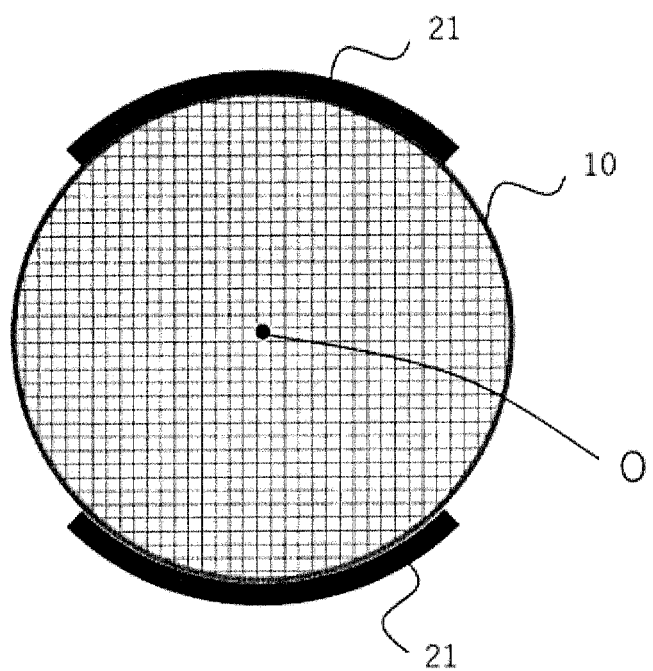

[FIG. 3]
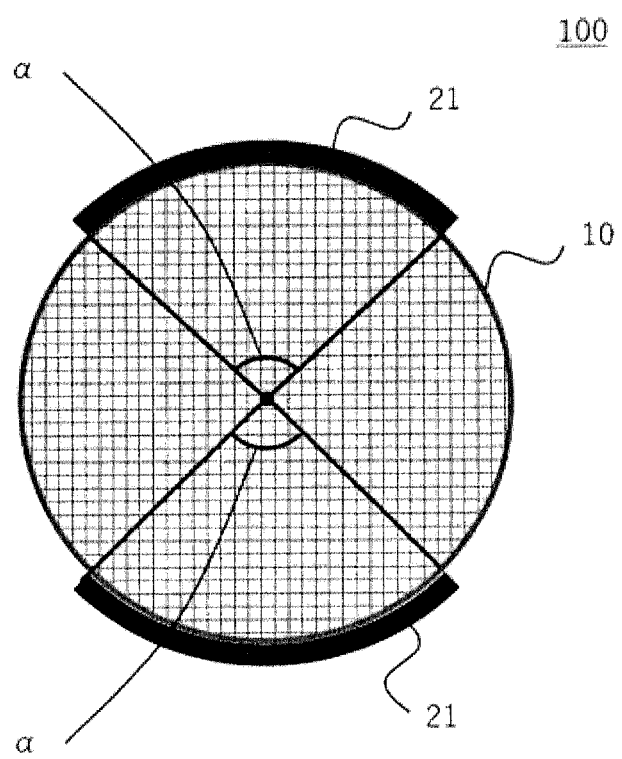

[FIG. 4]
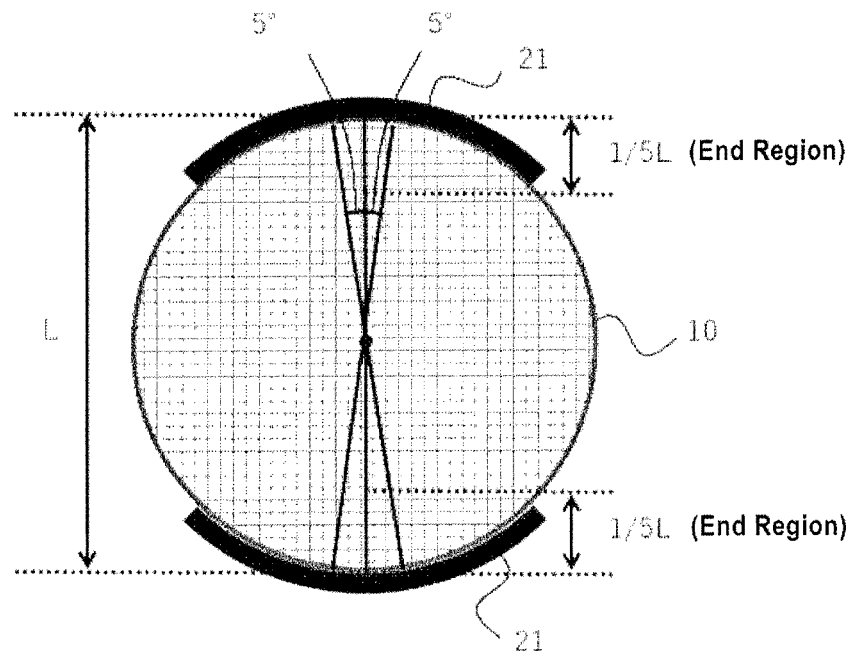

[FIG. 5]
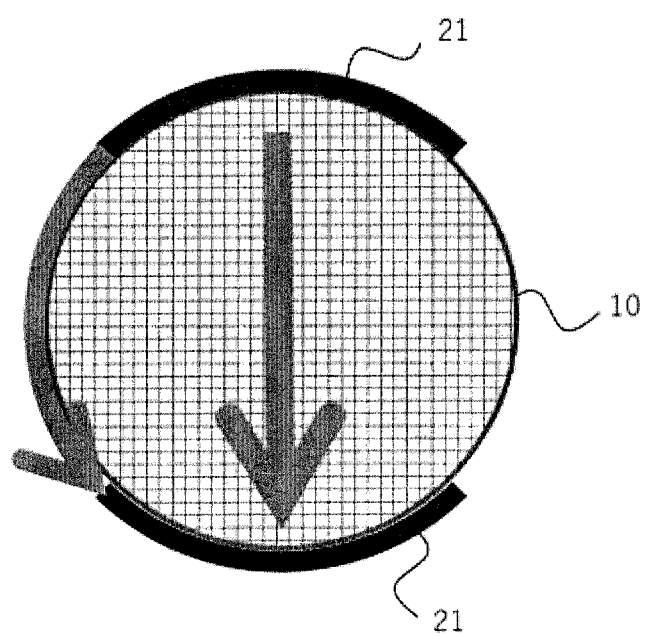

[FIG. 6]
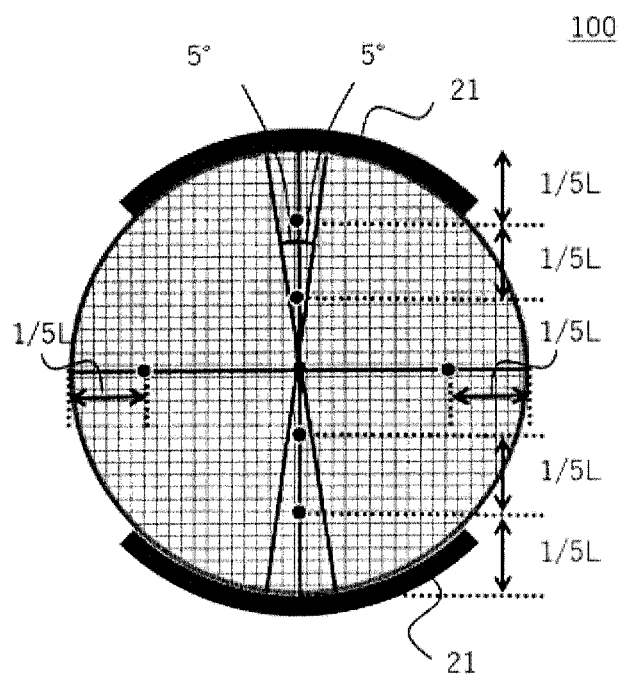

HONEYCOMB STRUCTURE

This application claims the benefit under 35 USC § 119(a)-(d) of Japanese Application No. 2018-063062 filed Mar. 28, 2018, the entirety of which is incorporated herein by reference.

FIELD OF THE INVENTION

The present invention relates to a honeycomb structure.

BACKGROUND OF THE INVENTION

Conventionally, a member in which a catalyst is supported on a honeycomb structure made of cordierite or silicon carbide is used for treatment of harmful substances in exhaust gases discharged from motor vehicle engines (see, Patent Document 1). Such a honeycomb structure generally has a pillar shaped honeycomb structure that includes partition walls defining a plurality of cells extending from one end face to the other end face to form flow paths for an exhaust gas.

For the treatment of the exhaust gas with the catalyst supported on the honeycomb structure, a temperature of the catalyst is required for being increased to a predetermined temperature. However, as the engine is started, the catalyst temperature is lower, conventionally causing a problem that the exhaust gas is not sufficiently purified. Therefore, a system called an electric heating catalyst (EHC) has been developed. In the system, electrodes are disposed on a honeycomb structure made of conductive ceramics and the honeycomb structure itself generates heat by electric conduction, whereby the temperature of the catalyst supported on the honeycomb structure is increased to an activation temperature before or during starting of the engine.

Patent Document 1 proposes a honeycomb structure which is a catalyst support and also functions as a heater by applying a voltage, and which can suppress a bias of a temperature distribution when a voltage is applied. More particularly, it proposes that the bias of the temperature distribution when the voltage is applied is suppressed by disposing a pair of electrode portions in the form of strip on two positions on a side surface of the pillar shaped honeycomb structure in an extending direction of a cell of the honeycomb structure, and disposing one electrode portion of the pair of electrode portions so as to be opposed to the other electrode portion of the pair of electrode portions across a center of the honeycomb structure, in a cross section orthogonal to the extending direction of the cell.

Since a portion having a honeycomb structure (i.e., a portion serving as a support for a catalyst; hereinafter referred to as a "honeycomb structure portion") has usually higher electric resistance than that of electrode portions, current from a terminal connected to the electrode portion tends to be spread out in the electrode portion, before flowing through the honeycomb structure portion. However, when the electrical resistance inside the honeycomb structure is uniform, there is a problem that a large amount of current flows near an end portion of the electrode portion where a distance passing through the honeycomb structure portion is shorter, so that a heat generation distribution of the honeycomb structure portion is biased to generate variations in the heating of the catalyst.

To solve the problem, Patent Document 2 discloses that the thickness of the partition wall of the support is set such that the electric resistance of all the current paths between the terminals is equal to that of the hollow case forming the exterior (paragraph [0009] of Patent Document 2).

Further, to solve the above problem, Patent Document 3 discloses a honeycomb structure in which an electric resistivity of a material that serves as a fluid flow path and forms an outer peripheral region is lower than an electric resistivity of a material forming a central region (paragraph [0013] of Patent Document 3).

CITATION LIST

Patent Literatures

Patent Document 1: WO 2013/146955 A1
Patent Document 2: Japanese Patent Application Publication No. 2011-99405 A
Patent Document 3: Japanese Patent Application Publication No. 2014-198321 A

SUMMARY OF THE INVENTION

Patent Document 2 is intended to heat uniformly the honeycomb structure portion by setting the thickness of each partition wall of the honeycomb structure portion so as to satisfy predetermined conditions. However, there is a problem that the setting of the thickness of each partition wall of the honeycomb structure portion in accordance with the current results in positions where mechanical strength is partially lower, and the strength as the catalyst support is decreased.

Further, Patent Document 3 is intended to heat uniformly the honeycomb structure portion by setting the electric resistivity of the honeycomb structure portion to be lower in the outer peripheral region than in the central region. However, there is a problem that if the electric resistivity of the outer peripheral region is lower, current flows through the outer peripheral portion, so that it is difficult to heat the central region.

The present invention has been made in view of the above problems. An object of the present invention is to provide a honeycomb structure capable of more uniformly generating heat (without bias of heat generation distribution) than the prior arts.

As a result of intensive studies, the present inventors have found that the above problems can be solved by controlling the distribution of electric resistivity in end regions and a central region of the honeycomb structure portion. Thus, the present invention is specified as follows:

(1) A honeycomb structure, comprising:
a pillar shaped honeycomb structure portion having:
porous partition walls extending through the honeycomb structure from an inflow end face to an outflow end face to define a plurality of cells forming a through channel;
an outer peripheral wall located at the outermost periphery; and
a pair of electrode portions disposed on a side surface of the honeycomb structure portion;
wherein each of the pair of electrode portions is formed in a strip shape extending in an extending direction of the cells of the honeycomb structure portion;
wherein, in a cross section orthogonal to the extending direction of the cells, one electrode portion of the pair of electrode portions is disposed on a side opposed to the other electrode portion across a center of the honeycomb structure portion;

wherein the honeycomb structure portion consists:
end regions near the pair of electrode portions; and
a central region that is a center region excluding the end regions; and
wherein an average electric resistivity A of a material forming the end regions is lower than an average electric resistivity B of a material forming the central region.

(2) The honeycomb structure according to (1), wherein the A and the B satisfy a relationship: $1/5 \leq A/B \leq 4/5$.

(3) The honeycomb structure according to (1) or (2), wherein the honeycomb structure portion is mainly based on a silicon-silicon carbide composite material or silicon carbide.

(4) The honeycomb structure according to any one of (1) to (3), wherein the honeycomb structure portion has an electric resistivity of from 0.1 to 100 Ω·cm and the electrode portions have an electric resistivity of from 0.001 to 1.0 Ω·cm.

(5) The honeycomb structure according to any one of (1) to (4), wherein each of the electrode portions has a central angle of from 60 to 120°.

According to the present invention, it is possible to provide a honeycomb structure capable of more uniformly generating heat than the prior arts.

BRIEF DESCRIPTION OF THE DRAWINGS

FIG. 2 is a cross-sectional view of a honeycomb structure according to an embodiment of the present invention.

FIG. 3 is a view showing a central angle of each electrode portion in an embodiment of the present invention.

FIG. 4 is a view showing end regions and a central region in an embodiment of the present invention.

FIG. 5 is a view showing an outline of current paths in an embodiment of the present invention.

FIG. 6 is a view showing measurement points for temperatures and electric resistivity of end regions and a central region in an embodiment of the present invention.

DETAILED DESCRIPTION OF THE INVENTION

Figure 1:
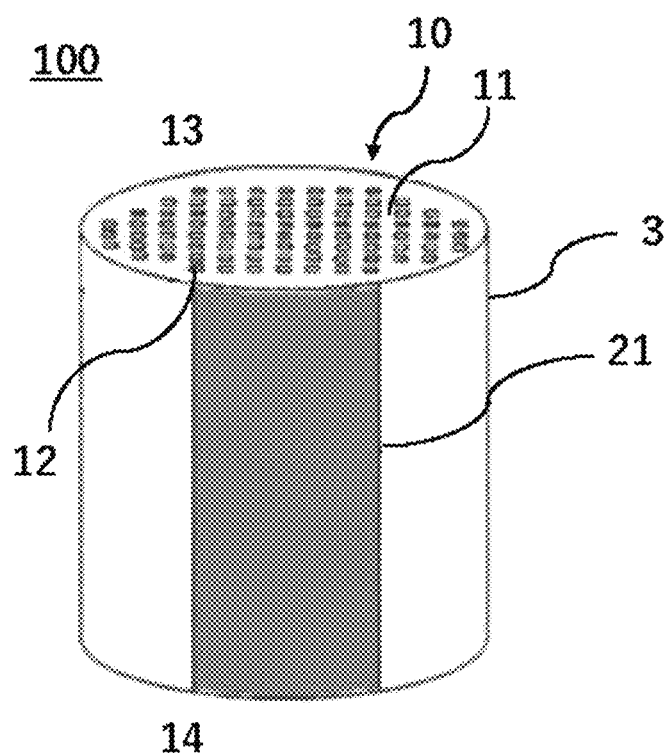
FIG. 1 is a view showing an example of a honeycomb structure portion in the present invention.

Hereinafter, embodiments of a support for an electrically heating type catalyst according to the present invention will be described with reference to the drawings. However, the present invention is not limited to the embodiments, and various changes, modifications, and improvements may be added without departing from the scope of the present invention, based on knowledge of those skilled in the art.

(1. Honeycomb Structure Portion)

FIG. 1 is a view showing an example of a honeycomb structure portion of a honeycomb structure 100 in the present embodiment. The honeycomb structure portion 10 includes: porous partition walls 11 extending through the honeycomb structure 100 from an inflow end face to an outflow end face to define a plurality of cells 12 forming a through channel and an outer peripheral wall located at the outermost periphery. The number, arrangement, shape and the like of the cells 12, as well as the thickness of each partition wall 11, and the like, are not limited and may be optionally designed as required.

A material of the honeycomb structure portion 10 is not particularly limited as long as it has conductivity, and metals, ceramics and the like may be used. In particular, from the viewpoint of compatibility of heat resistance and conductivity, preferably, the material of the honeycomb structure portion 10 is mainly based on a silicon-silicon carbide composite material or silicon carbide, and more preferably, it is a silicon-silicon carbide composite material or silicon carbide. Tantalum silicide ($TaSi_2$) and chromium silicide ($CrSi_2$) may also be added to lower the electric resistivity of the honeycomb structure. The phrase "the honeycomb structure portion 10 is mainly based on a silicon-silicon carbide composite" means that the honeycomb structure portion 10 contains 90% by mass or more of the silicon-silicon carbide composite material (total mass) based on the entire honeycomb structure portion. Here, for the silicon-silicon carbide composite material, it contains silicon carbide particles as an aggregate and silicon as a bonding material for bonding the silicon carbide particles, and a plurality of silicon carbide particles are bonded by silicon so as to form pores between the silicon carbide particles. The phrase "the honeycomb structure portion 10 is mainly based on silicon carbide" means that the honeycomb structure portion 10 contains 90% by mass or more of silicon carbide (total mass) based on the entire honeycomb structure portion.

The electric resistivity of the honeycomb structure portion 10 may be set as needed depending on voltage to be applied, including, but not particularly limited to, from 0.01 to 100 Ω·cm, for example. For a higher voltage of 64 V or more, it may be from 2 to 200 Ω·cm, and typically from 5 to 100 Ω·cm. Further, for a lower voltage of less than 64 V, it may be from 0.001 to 2 Ω·cm, and typically from 0.001 to 1 Ω·cm, and more typically from 0.01 to 1 Ω·Cm. As used herein, the electric resistivity of the honeycomb structure portion 10 refers to an electric resistivity when measured by a four-terminal method with a multimeter.

In addition, the distribution of the electric resistivity of the honeycomb structure 10 in end regions and a central region will be described below.

Each partition wall 11 of the honeycomb structure portion 10 preferably has a porosity of from 35 to 60%, and more preferably from 35 to 45%. The porosity of less than 35% may result in larger deformation during firing. The porosity of more than 60% may result in decreased strength of the honeycomb structure portion. The porosity is a value measured by a mercury porosimeter.

Each partition wall 11 of the honeycomb structure portion 10 preferably has an average pore size of from 2 to 15 µm, and more preferably from 4 to 8 µm. The average pore diameter of less than 2 µm may result in excessively higher electric resistivity. The average pore diameter of more than 15 µm may result in excessively lower electric resistivity. The average pore size is a value measured by a mercury porosimeter.

The shape of each cell 12 in a cross section of each cell orthogonal to a flow path direction is not limited, but it may preferably be a square, a hexagon, an octagon, or a combination thereof. Among these, the square and hexagonal shapes are preferable. Such a cell shape leads to a decreased pressure loss when an exhaust gas flows through the honeycomb structure portion 10, and improved purification performance of the catalyst.

The outer shape of the honeycomb structure portion 10 is not particularly limited as long as it is a pillar shape. Further, for the size of the honeycomb structure portion 10, the honeycomb structure portion preferably has an area of bottom surfaces of from 2000 to 20000 $mm^2$, and more preferably from 4000 to 10000 $mm^2$, in terms of increasing heat resistance (preventing cracks generated in a circumferential direction of the outer peripheral side wall). Further, an axial length of the honeycomb structure portion 10 is preferably from 50 to 200 mm, and more preferably from 75 to 150 mm, in terms of increasing the heat resistance (preventing cracks generated in a direction parallel to a central axis direction on the outer peripheral side wall).

The outer peripheral wall 3 forming the outermost periphery of the honeycomb structure portion 10 of the honeycomb structure 100 according to the present embodiment preferably has a thickness of from 0.1 to 2 mm. If it is less than 0.1 mm, the strength of the honeycomb structure 100 may be decreased. If it is more than 2 mm, the areas of the partition walls supporting the catalyst may be decreased.

Further, the honeycomb structure portion 10 can be used as a catalyst support by supporting a catalyst on the honeycomb structure portion 10.

In the present embodiment, when discussing the honeycomb structure 10 by dividing it into end regions near a pair of electrode portions as described below and a central region that is a center region excluding the end regions, it is important that an average electric resistivity A of a material forming the end regions is lower than an average electric resistivity B of a material forming the central region.

Here, the end regions and the central region are defined as follows. First, in a cross section orthogonal to the extending direction of the cell of the honeycomb structure portion 10, a straight line L is drawn so as to connect center points of a pair of electrode portions 21, 21, which is a circumferential length of the honeycomb structure portion 10. As described below, the pair of electrode portions 21, 21 are disposed on sides of the honeycomb structure portion 10, which are opposite to each other across a center O of the honeycomb structure portion 10, so that the straight line L passes through the center O of the honeycomb structure portion 10. Therefore, the length of the straight line L is a diameter of the honeycomb structure portion 10. Straight lines are then drawn so as to form a central angle of 5° on each of left and right sides using the straight line L as a center. Therefore, both the straight lines define regions of the central angle 10° around the straight line L. Among the regions, each region up to the length of ⅓ from the outer peripheral wall of the honeycomb structure 10 is defined as the end region.

The portion excluding the end regions is defined as the central region.

When the A is lower than the B, a current easily flows through the end regions of the honeycomb structure portion 10 (see FIG. 5), thereby allowing effective suppression of the problem that a large amount of current flows near the end portions of the electrode portion, the heat generation distribution of the honeycomb structure portion is biased to generate variations in the heating of the catalyst, as described above. Therefore, the vicinity of the center O of the honeycomb structure portion 10 is heated as compared with a case where a current flows only in the outer peripheral region of the honeycomb structure portion 10, so that the entire honeycomb structure portion 10 is heated by current heat or thermal conduction of the partition walls, which makes the temperature distribution more uniform.

The preferred ranges of A and B are the same as described above.

Further, in terms of strengthening the current path passing through not only the outer periphery of the honeycomb structure 10 but also the center, the A and the B preferably satisfy the relationship: ⅕≤A/B≤⅘.

(2. Electrode Portion)

As shown in FIG. 2, the honeycomb structure portion 10 according to the present embodiment include a pair of electrode portions 21 provided in contact with the outer surface of the outer peripheral side wall and so as to be opposed to each other across the center O of the honeycomb structure portion 10. Each of the pair of electrode portions 21, 21 is formed in a "strip shape" extending in the extending direction of the cell 12 of the honeycomb structure portion 10. Thus, in the honeycomb structure 100 of the present embodiment, each electrode portion 21 is formed in a strip shape, the longitudinal direction of each electrode portion 21 is the extending direction of the cell 12 of the honeycomb structure portion 10, and the pair of electrode portions 21, 21 are arranged to be opposed to each other across the center O of the honeycomb structure portion 10.

Further, in the cross section orthogonal to the extending direction of the cell 12, a central angle α of each of the electrode portions 21, 21 is preferably from 60 to 120°. Furthermore, in the cross section orthogonal to the extending direction of the cell 12, an upper limit of the central angle α of each of the electrode portions 21, 21 is preferably 110, and more preferably 100. In the cross section orthogonal to the extending direction of the cell 12, a lower limit of the central angle α of each of the electrode portions 21, 21 is preferably 70, and more preferably 80. Further, the central angle α of one electrode portion 21 is preferably from 0.8 to 1.2 times larger than the central angle α of the other electrode portion 21, and more preferably 1.0 times (the same size). This can allow suppression of the bias of current flowing through the outer periphery and the central region of the honeycomb structure portion when a voltage is applied between the pair of electrode portions 21, 21. In each of the outer periphery and the central region of the honeycomb structure portion, any bias of heat generation can be suppressed.

As used herein, the central angle α refers to an angle formed by straight lines connecting both end portions of the electrode portions 21 and the center O of the honeycomb structure portion, in the cross section orthogonal to the extending direction of the cell 12 (see FIG. 3). In FIG. 3, the central angles α of the pair of electrode portions 21 are the same.

In the honeycomb structure 100 according to the present embodiment, the electric resistivity of the electrode portions 21 is preferably lower than the electric resistivity of the outer peripheral wall of the honeycomb structure portion 10. Further, the electric resistivity of the electrode portions 21 is more preferably from 0.1 to 10%, and particularly preferably from 0.5 to 5%, of the electric resistivity of the outer peripheral wall of the honeycomb structure portion 10. If it is lower than 0.1%, an amount of current flowing to the "end portions of the electrode portion" within the electrode portion 21 will be increased when a voltage is applied to the electrode portions 21, so that the current flowing through the honeycomb structure portion 10 may be easily biased. In addition, it may be difficult for the honeycomb structure 10 to generate heat uniformly. If it is higher than 10%, an amount of current spreading in the electrode portions 21 is decreased when a voltage is applied to the electrode portions 21, and the current flowing through the honeycomb structure portion 10 may be easily biased. In addition, it may be difficult for the honeycomb structure 10 to generate heat uniformly.

Each electrode portion 21 preferably has a thickness of from 0.01 to 5 mm, and more preferably from 0.01 to 3 mm. The thickness in such a range can provide contribution to uniform heat generation of the honeycomb structure portion. If the thickness of each electrode portion 21 is less than 0.01 mm, the electric resistivity will be increased and uniform heat generation may not be possible. If the thickness of each electrode portion 21 is more than 5 mm, breakage may occur during canning.

As shown in FIG. 1, in the honeycomb structure 100 according to the present embodiment, each of the electrode portions 21, 21 extends in the extending direction of the cell 12 of the honeycomb structure portion 10 and is formed in a strip shape "extending between both end portions (both end faces 13, 14)". Thus, in the honeycomb structure 100 according to the present embodiment, the pair of electrode portions 21, 21 are disposed so as to extend between both end portions of the honeycomb structure portion 10. This can allow more effective suppression of the bias of the current in the axial direction of the honeycomb structure portion (that is, the extending direction of the cell 12) when a voltage is applied between the pair of electrode portions 21, 21. As used herein, the phrase "electrode portion 21 is formed (disposed) between both end portions of the honeycomb structure portion 10" has the following meaning: one end portion of the electrode portion 21 is in contact with one end portion (one end face) of the honeycomb structure portion 10 and the other end portion of the electrode portion 21 is in contact with the other end portion (the other end face) of the honeycomb structure portion 10.

On the other hand, a preferable embodiment is also a state where at least one end portion of each electrode portion 21 in "the extending direction of the cell 12 of the honeycomb structure portion 10" is not in contact with the end portion (end face) of the honeycomb structure portion 10. This can improve thermal shock resistance of the honeycomb structure.

In the honeycomb structure 100 of the present embodiment, each electrode portion 21 is formed in a shape such that a planar rectangular member is curved along an outer periphery of a pillar shape, for example as shown in FIGS. 1 to 3. Here, a shape when the curved electrode portion 21 is deformed into a non-curved planar member will be referred to as a "planar shape" of the electrode portion 21. The "planar shape" of the electrode portion 21 shown in FIGS. 1 to 3 will be a rectangle. An "outer peripheral shape of the electrode portion" as used herein means "an outer peripheral shape in the planar shape of the electrode portion".

In the honeycomb structure 100 according to the present embodiment, the outer peripheral shape of the strip-shaped electrode portion may be a shape in which each of rectangular corner portions are formed in a curved shape. Such a shape allows improvement of the thermal shock resistance of the honeycomb structure. A preferable embodiment is that the outer periphery of the strip-shaped electrode portion has a shape in which the rectangular corner portions are linearly chamfered. Such a shape can allow improvement of the thermal shock resistance of the honeycomb structure.

In the honeycomb structure 100 according to the present embodiment, the length of the current path is preferably 1.6 times or less the diameter of the honeycomb structure portion, in the cross section orthogonal to the extending direction of the cell. If it is more than 1.6 times, energy may be unnecessarily consumed. As used herein, the "current path" refers to a path through which a current flows. The "length of the current path" refers to a length 0.5 times the length of the "outer periphery" through which current flows, in the "cross section orthogonal to the extending direction of the cell" of the honeycomb structure. This means the maximum length of the "flow paths through which current flows" in the "cross section orthogonal to the extending direction of the cell" of the honeycomb structure. The "length of the current path" is a value measured along surfaces within irregularities or a slit when the irregularities are formed on the outer periphery or the slit opening to the outer periphery are formed in the honeycomb structure portion. Therefore, for example, when the slit opening to the outer periphery is formed in the honeycomb structure portion, "the length of the current path" will be longer by a length approximately two times the depth of the slit.

The electric resistivity of the electrode portions 21 is preferably from 0.01 to 1.0 Ωcm. By such a range of the electric resistivity of the electrode portion 21, the pair of electrode portions 21, 21 effectively act as electrodes in a pipe through which an exhaust gas at an elevated temperature flows. If the electric resistivity of the electrode portion 21 is less than 0.01 Ωcm, the temperature of the honeycomb portion near both ends of the electrode portion 21 will tend to rise, in the cross section orthogonal to the extending direction of the cell. If the electric resistivity of the electrode portion 21 is more than 1.0 Ωcm, current will hardly flow, so that it may be difficult to play a role as an electrode. The electric resistivity of each electrode portion is a value at room temperature (25° C.).

Each electrode portion 21 preferably has a porosity of from 30 to 60%, and more preferably 30 to 55%. The porosity of each electrode portion 21 in such a range can provide a suitable electric resistivity. If the porosity of the electrode portion 21 is less than 30%, deformation will occur during the production. If the porosity of each electrode portion 21 is more than 60%, the electric resistivity may be excessively increased. The porosity is a value measured with a mercury porosimeter.

Each electrode portion 21 preferably has an average pore diameter of from 5 to 45 μm, and more preferably 7 to 40 μm. The average pore diameter of each electrode portion 21 in such a range can provide a suitable electric resistivity. If the average pore diameter of each electrode portion 21 is less than 5 μm, the electric resistivity may become too high. If the average pore diameter of each electrode portion 21 is more than 45 μm, the strength of each electrode portion 21 may be weakened and each electrode portion 21 may tend to be broken. The average pore size is a value measured with a mercury porosimeter.

When each electrode portion 21 is mainly based on the "silicon-silicon carbide composite material", silicon carbide particles contained in each electrode portion 21 preferably have an average particle diameter of from 10 to 60 μm, and more preferably 20 to 60 μm. The average particle diameter of the silicon carbide particles contained in the electrode portion 21 in such a range can allow the electric resistivity of the electrode portion 21 to be controlled within a range of from 0.1 to 100 Ωcm. If the average pore diameter of the silicon carbide particles contained in the electrode portion 21 is less than 10 μm, the electric resistivity of each electrode portion 21 may become too high. If the average pore diameter of the silicon carbide particles contained in the electrode portion 21 is more than 60 μm, the strength of each electrode portion 21 may be weakened and each electrode portion 21 may tend to be broken. The average particle diameter of the silicon carbide particles contained in the electrode portion 21 is a value measured by a laser diffraction method.

When each electrode portion 21 is mainly based on the "silicon-silicon carbide composite material", a ratio of a mass of silicon contained in the electrode portions 21 to "the total of the respective masses of silicon carbide particles and silicon" contained in the electrode portions 21 is preferably in a range of from 20 to 40% by mass. The ratio of the mass of silicon to "the total of the respective masses of silicon carbide particles and silicon" contained in the electrode portions 21 is more preferably from 25 to 35% by mass. By such a range of the ratio of the mass of silicon to "the total of the respective masses of silicon carbide particles and silicon" contained in the electrode portions 21, the electric resistivity of the electrode portions 21 can be in a range of from 0.1 to 100 Ωcm. If the ratio of the mass of silicon to "the total of the respective masses of silicon carbide particles and silicon" contained in the electrode portions 21 is less than 20% by mass, the electric resistivity may become too high, and if it is more than 40% by mass, deformation may tend to occur during the production.

The honeycomb structure 100 according to the present embodiment preferably has an isostatic strength of 1 MPa or more, and more preferably 3 MPa or more. The isostatic strength is preferably as high as possible, but an upper limit will be about 6 MPa, in view of the material, structure and the like of the honeycomb structure 100. If the isostatic strength is less than 1 MPa, the honeycomb structure may be easily broken when used as a catalyst support or the like. The isostatic strength is a value measured by applying a hydrostatic pressure in water.

(3. Production Method)

Production of the honeycomb structure portion can be carried out in accordance with a method for making a honeycomb structure portion in a known method for producing a honeycomb structure portion. For example, first, a forming material is prepared by adding metallic silicon powder (metallic silicon), a binder, a surfactant(s), a pore former, water, and the like to silicon carbide powder (silicon carbide). It is preferable that a mass of metallic silicon is from 10 to 40% by mass relative to the total of mass of silicon carbide powder and mass of metallic silicon. The average particle diameter of the silicon carbide particles in the silicon carbide powder is preferably from 3 to 50 μm, and more preferably from 3 to 40 μm. The average particle diameter of the metallic silicon particles in the metallic silicon powder is preferably from 2 to 35 μm. The average particle diameter of each of the silicon carbide particles and the metallic silicon particles refers to an arithmetic average diameter on volume basis when frequency distribution of the particle size is measured by the laser diffraction method. The silicon carbide particles are fine particles of silicon carbide forming the silicon carbide powder, and the metallic silicon particles are fine particles of metallic silicon forming the metallic silicon powder. It should be noted that this is formulation for forming raw materials in the case where the material of the honeycomb structure portion is the silicon-silicon carbide composite material. In the case where the material of the honeycomb structure portion is silicon carbide, no metallic silicon is added.

Examples of the binder include methyl cellulose, hydroxypropyl methyl cellulose, hydroxypropoxyl cellulose, hydroxyethyl cellulose, carboxymethyl cellulose, polyvinyl alcohol and the like. Among these, it is preferable to use methyl cellulose in combination with hydroxypropoxyl cellulose. The content of the binder is preferably from 2.0 to 10.0 parts by mass when the total mass of the silicon carbide powder and the metallic silicon powder is 100 parts by mass.

The content of water is preferably from 20 to 60 parts by mass when the total mass of the silicon carbide powder and the metallic silicon powder is 100 parts by mass.

The surfactant that can be used includes ethylene glycol, dextrin, fatty acid soaps, polyalcohol and the like. These may be used alone or in combination of two or more. The content of the surfactant is preferably from 0.1 to 2.0 parts by mass when the total mass of the silicon carbide powder and the metallic silicon powder is 100 parts by mass.

The pore former is not particularly limited as long as the pore former itself forms pores after firing, including, for example, graphite, starch, foamed resins, water absorbing resins, silica gel and the like. The content of the pore former is preferably from 0.5 to 10.0 parts by mass when the total mass of the silicon carbide powder and the metallic silicon powder is 100 parts by mass. An average particle diameter of the pore former is preferably from 10 to 30 μm. If it is less than 10 μm, pores may not be sufficiently formed. If it is more than 30 μm, a die may be clogged with the pore former during forming. The average particle size of the pore former refers to an arithmetic average diameter on volume basis when frequency distribution of the particle size is measured by the laser diffraction method. When the pore former is the water absorbing resin, the average particle diameter of the pore former is an average particle diameter after water absorption.

Then, the resulting forming raw materials are kneaded to form a green body, and the green body is then extruded to prepare a honeycomb structure portion. In extrusion molding, a die having a desired overall shape, cell shape, partition wall thickness, cell density and the like can be used. Preferably, the resulting honeycomb structure portion is dried. A drying method is not particularly limited, and examples of the method include electromagnetic wave heating methods such as microwave heating and drying, and high frequency dielectric heating and drying, and external heating methods such as hot air drying and superheated steam drying. Among them, from the viewpoint that the entire formed product can be quickly and uniformly dried so as not to cause cracks, a certain amount of moisture is dried by the electromagnetic wave heating method, and the remaining moisture is dried by the external heating method. The drying is preferably carried out under conditions where moisture of from 30 to 99% by mass is removed relative to the moisture amount before drying by the electromagnetic wave heating method, and the moisture is then reduced to 3% by mass or less by the external heating method. The electromagnetic wave heating method is preferably dielectric heating drying, and the external heating method is preferably hot air drying. A drying temperature is preferably from 50 to 100° C.

When the length in the central axis direction of the honeycomb structure portion is not the desired length, both the end faces of the honeycomb structure portion can be cut to the desired length. A non-limiting cutting method includes a method that utilizes a circular saw cutting machine or the like.

The honeycomb dried body is then fired to prepare a honeycomb fired body. In the firing, for example, the honeycomb dried body is fired in an Ar atmosphere at 1400° C. for 3 hours. In the firing, the electric resistivity distribution of the present invention is easily achieved by, for example, placing a screen made of the same material between sheaths (which refer to enclosures used in the firing) for a site to be high resistance relative to a site to be low resistance, and then firing the honeycomb dried body in an Ar atmosphere containing 1.0 vol % of $N_2$ at 1400° C. for 3 hr.

It should be noted that a means for achieving the electric resistivity distribution of the present invention is not particularly limited, and the electric resistivity distribution of the present invention can be achieved, even by changing factors affecting the electric resistivity, such as the material of the honeycomb structure portion and the wall thickness, in addition to the above means.

Before firing, calcination may preferably be carried out in order to remove the binder and the like. The calcination is preferably performed in an air atmosphere at a temperature of from 400 to 500° C. for 0.5 to 20 hours. The methods of calcination and firing are not limited, and they may be carried out using an electric furnace, a gas furnace or the like. The firing can be preferably carried out in an inert atmosphere such as nitrogen or argon at a temperature of from 1300 to 1500° C. for 1 to 20 hours. After firing, an oxygenation treatment is preferably carried out at a temperature of from 1000 to 1250° C. for 1 to 10 hours in order to improve durability.

The electrode portions are then formed on the honeycomb dried body. It is preferable to prepare an electrode portion-forming raw material for forming the electrode portions. When each electrode portion is mainly based on the "silicon-silicon carbide composite material", the electrode portion-forming material is preferably formed by adding certain additives to silicon carbide powder and silicon powder and kneading the mixture.

More particularly, it is preferable to add metallic silicon powder (metallic silicon), a binder, a surfactant(s), a pore former, water and the like to silicon carbide powder (silicon carbide), and knead them to prepare an electrode portion-forming material. When the total mass of silicon carbide powder and metallic silicon is 100 parts by mass, the mass of metallic silicon is preferably from 20 to 40 parts by mass. The average particle diameter of the silicon carbide particles in the silicon carbide powder is preferably from 10 to 60 μm. The average particle size of the metallic silicon powder (metallic silicon) is preferably from 2 to 20 μm. If the average particle diameter of the metallic silicon powder (metallic silicon) is less than 2 μm, the electric resistivity may become too low. If the average particle diameter of the metallic silicon powder (metallic silicon) is more than 20 μm, the electric resistivity may become too high. The average particle diameter of each of silicon carbide particles and metallic silicon (metallic silicon particles) is a value measured by the laser diffraction method. The silicon carbide particles are fine particles of silicon carbide forming the silicon carbide powder, and the metallic silicon particles are fine particles of metallic silicon forming the metallic silicon powder.

Examples of the binder include methyl cellulose, hydroxypropyl methyl cellulose, hydroxypropoxyl cellulose, hydroxyethyl cellulose, carboxymethyl cellulose, polyvinyl alcohol and the like. Among these, it is preferable to use methyl cellulose in combination with hydroxypropoxyl cellulose. The content of the binder is preferably from 0.1 to 5.0 parts by mass when the total mass of the silicon carbide powder and the metallic silicon powder is 100 parts by mass.

The content of water is preferably from 15 to 60 parts by mass when the total mass of the silicon carbide powder and the metallic silicon powder is 100 parts by mass.

The surfactant that can be used includes ethylene glycol, dextrin, fatty acid soaps, polyalcohol and the like. These may be used alone or in combination of two or more. The content of the surfactant is preferably from 0.1 to 2.0 parts by mass when the total mass of the silicon carbide powder and the metallic silicon powder is 100 parts by mass.

The pore former is not particularly limited as long as the pore former itself forms pores after firing, including, for example, graphite, starch, foamed resins, water absorbing resins, silica gel and the like. The content of the pore former is preferably from 0.1 to 5.0 parts by mass when the total mass of the silicon carbide powder and the metallic silicon powder is 100 parts by mass. An average particle diameter of the pore former is preferably from 10 to 30 μm. If it is less than 10 μm, pores may not be sufficiently formed. If it is more than 30 μm, larger pores may tend to occur, thereby causing a decrease in strength. The average particle size of the pore former is a value measured by the laser diffraction method.

Preferably, a mixture obtained by mixing silicon carbide powder (silicon carbide), metallic silicon (metallic silicon powder), a binder, a surfactant(s), a pore former, water and the like is then kneaded to obtain an electrode portion-forming raw material in the form of paste or slurry. The kneading method is not particularly limited, and for example, a vertical type stirrer may be used.

Preferably, the resulting electrode portion-forming material is then applied to a side surface of the honeycomb fired body. The method of applying the electrode portion-forming material to the side surface of the honeycomb fired body is not particularly limited, but for example, a printing method can be used. Further, the electrode portion-forming material is preferably applied to the side surface of the honeycomb fired body so as to have the shape of each electrode portion in the honeycomb structure according to the present invention. Each electrode portion can have a desired thickness by adjusting the thickness at the time of applying the electrode portion-forming raw material. Thus, the electrode portions can be formed only by applying the electrode portion-forming material to the side surface of the honeycomb fired body and drying and firing it, so that the electrode portions can be very easily formed.

Subsequently, the electrode portion-forming material applied to the side surface of the honeycomb fired body is preferably dried to form unfired electrodes and to prepare a honeycomb fired body with unfired electrodes. The drying condition is preferably from 50 to 100° C.

The honeycomb fired body with unfired electrodes is then fired to prepare a honeycomb structure. In this case, the unfired electrodes are mainly fired. Before firing, calcination is preferably carried out in order to remove the binder and the like. The calcination is preferably performed in an air atmosphere at a temperature of from 400 to 500° C. for 0.5 to 20 hours. The methods of calcination and firing are not limited, and they may be carried out using an electric furnace, a gas furnace or the like. The firing can be preferably carried out in an inert atmosphere such as nitrogen or argon at a temperature of from 1400 to 1500° C. for 1 to 20 hours. After firing, an oxygenation treatment is preferably carried out at a temperature of from 1200 to 1350° C. for 1 to 10 hours in order to improve durability.

EXAMPLES

Hereinafter, while the present invention will be more specifically described with reference to Examples, the present invention is not limited to these Examples.

Metallic silicon (Si) powder was used as a ceramic raw material. To the ceramic raw material were added hydroxypropyl methyl cellulose as a binder, a water absorbing resin as a pore former, and water to form a forming raw material. The forming raw material was then kneaded by means of a vacuum green body kneader to prepare a pillar shaped green body. The content of the binder was 7 parts by mass based on 100 parts by mass of metallic silicon (Si) powder. The content of the pore former was 3 parts by mass based on 100 parts by mass of metallic silicon (Si) powder. The content of water was 42 parts by mass based on 100 parts by mass of metallic silicon (Si) powder. The average particle diameter of metallic silicon (Si) powder was 6 µm. The average particle diameter of the pore former was 20 µm. The average particle diameter of each of the metallic silicon (Si) and the pore former is a value measured by the laser diffraction method.

The resulting pillar shaped green body was formed using an extruder to obtain a honeycomb formed body having a diameter of 80 mm. The resulting honeycomb formed body was subjected to high-frequency dielectric heating and drying and then dried at 120° C. for 2 hours using a hot air drier, and a predetermined amount of both end faces were cut to prepare a honeycomb dried body having a length of 75 mm.

Subsequently, the honeycomb dried body was degreased (calcined) and then fired. The conditions for the firing were 1370° C. for 3 hr for Comparative Examples 1 and 2, and 1390° C. for 3 hr for Examples 1 and 2. For Examples 1 and 2, the firing was performed in an Ar atmosphere containing 1.0 vol % of $N_2$ at 1390° C. for 3 hours.

The honeycomb body after the firing was further oxidized to obtain a honeycomb fired body. Degreasing was carried out at 550° C. for 3 hours. An oxidation treatment was carried out at 1300° C. for 1 hour.

Then, to metallic silicon (Si) powder were added hydroxypropyl methyl cellulose as a binder, glycerin as a humectant, and a surfactant as a dispersant, and water and mixed together. The mixture was kneaded to prepare an electrode portion-forming raw material. The content of the binder was 0.5 parts by mass based on 100 parts by mass of metallic silicon (Si) powder, and the content of the glycerin was 10 parts by mass based on 100 parts by mass of metallic silicon (Si) powder, and the content of the surfactant was 0.3 parts by mass based on 100 parts by mass of metallic silicon (Si) powder, and the content of water was 42 parts by mass based on 100 parts by mass of metallic silicon (Si) powder. The average particle diameter of metallic silicon (Si) powder was 6 µm. The average particle diameter of metallic silicon (Si) is a value measured by the laser diffraction method. The kneading was carried out by means of a vertical stirrer.

The electrode portion-forming raw material was then applied onto the side surface of the honeycomb fired body, in a strip shape so as to extend between the both end faces of the honeycomb fired body, such that a thickness was 1.5 mm, and "0.5 times of a central angle in the cross section orthogonal to the extending direction of the cell was 50°". The electrode portion-forming material was applied to two positions on the side surface of the honeycomb fired body. Then, in the cross section orthogonal to the extending direction of the cell, one of the two portions coated with the electrode portion-forming material was disposed on a side opposite to the other, across the center of the honeycomb fired body.

The electrode portion-forming raw material applied to the honeycomb fired body was then dried to obtain a honeycomb fired body with unfired electrodes. The drying temperature was 70° C.

Subsequently, the honeycomb dried body was degreased (calcined), fired and further oxidized to obtain a honeycomb structure. Degreasing was carried out at 550° C. for 3 hours. The firing was performed in an Ar atmosphere at 1450° C. for 2 hours. An oxidation treatment was carried out at 1300° C. for 1 hour.

The average pore diameter (pore diameter) of the partition walls of the resulting honeycomb structure was 8.6 µm and the porosity was 45%. The average pore diameter and the porosity are values measured by the mercury porosimeter.

Further, the thickness of the partition wall of the honeycomb structure was 90 µm, and the cell density was 90 cells/cm². Furthermore, each end face of the honeycomb structure was circular with a diameter of 93 mm, and the length of the honeycomb structure in the extending direction of the cell was 75 mm. In addition, the resulting honeycomb structure had an isostatic strength of 2.5 MPa. The isostatic strength is a fracture strength measured by applying hydrostatic pressure in water. The central angles of the two electrode portions of the honeycomb structure in the cross section orthogonal to the extending direction of the cell are shown in Table 1.

Further, the electric resistivity of each of the electrode portions of the honeycomb structures of Comparative Examples and Examples was measured at room temperature (25° C.), and it was 1.0 Ω·cm for all of Comparative Examples and Examples.

An electrical current test was carried out for each honeycomb structure obtained by the above procedures. In the electrical current test, temperatures of the end regions and the central region were measured as follows, after 20 seconds when terminals were connected to a pair of terminal connection portions and a voltage was applied with an input power of 1.5 kW. In the cross section orthogonal to the extending direction of the cell of the honeycomb structure portion, a temperature each of two points on a straight line L and at a distance of ⅕ L from the outer peripheral wall of each honeycomb structure portion 10 was measured, and an average value thereof was defined as a temperature of the end portion region. A temperatures at each of two points at a distance of further ⅕ L from each of the above two points on the straight line L (i.e., two points at a distance of ⅖ L from the outer peripheral wall of the honeycomb structure portion 10) and a temperature at each of two points at a distance of ⅕ L from the outer peripheral wall of each honeycomb structure 10 on a straight line passing through O and perpendicular to the straight line L were measured, and an average value of the temperatures of these four points was determined to be a temperature of the central region.

The electric resistivity of each of the end regions and the central region of each honeycomb structure portion 10 of Comparative Examples and Examples was measured as follows. In the cross section orthogonal to the extending direction of the cell of the honeycomb structure portion, as shown in FIG. 6, the electric resistivity of each of the two points on the straight line L at a distance of ⅕ L from the outer peripheral wall of each honeycomb structure portion 10 was measured, and an average value thereof was defined as the electric resistivity of the end region. The electric resistivity of each of two points at a distance of further ⅕ L from each of the above two points on the straight line L (that is, two points at a distance of ⅖ L from the outer peripheral wall of each honeycomb structure portion 10) and the electric resistivity of each of two points at a distance of ⅕ L from the outer peripheral wall of the honeycomb structure portion 10 on a straight line passing through the center O of the honeycomb structure portion 10 and perpendicular to the straight line L were measured, and an average value of the electric resistivity values of these four points was determined to be the electric resistivity of the central region. The electric resistivity was measured by a four-terminal method using a multimeter. The measurement results are shown in Table 1.

TABLE 1

|  | Central Angle of Electrode Portion (°) | Electric Resistivity (Ω · cm) | | Temperature (° C.) | | Uniform Heat Generation (Maximum Temp. − Minimum Temp.) |
| --- | --- | --- | --- | --- | --- | --- |
|  |  | End Region A | Central Region B | End Region | Central Region |  |
| Comparative Example 1 | 90 | 100 | 100 | 130 | 234 | 104 |
| Comparative Example 2 | 90 | 80 | 100 | 146 | 219 | 73 |
| Example 1 | 90 | 80 | 100 | 156 | 207 | 51 |
| Example 2 | 90 | 20 | 100 | 183 | 204 | 21 |

DESCRIPTION OF REFERENCE NUMERALS

100 . . . honeycomb structure
10 . . . honeycomb structure portion
11 . . . partition wall
12 . . . cell
13, 14 . . . both end faces of the honeycomb structure portion
21 . . . electrode portion

The invention claimed is:

1. A honeycomb structure, comprising:
a pillar shaped honeycomb structure portion having:
porous partition walls extending through the honeycomb structure from an inflow end face to an outflow end face to define a plurality of cells forming through channels;
an outer peripheral wall located at an outermost periphery of the honeycomb structure portion; and
a pair of electrode portions disposed on a side surface of the honeycomb structure portion;
wherein each electrode portion of the pair of electrode portions is formed in a strip shape extending in an extending direction of the plurality of cells of the honeycomb structure portion;
wherein, in a cross section orthogonal to the extending direction of the cells, one electrode portion of the pair of electrode portions is disposed on a side opposed to the other electrode portion of the pair of electrode portions across a center of the honeycomb structure portion;
wherein the honeycomb structure portion consists of:
end regions near the pair of electrode portions; and
a central region that is a center region excluding the end regions;
wherein an average electric resistivity A of a material forming the end regions is lower than an average electric resistivity B of a material forming the central region; and
wherein the end regions and the central region are defined as follows:
(1) in the cross section orthogonal to the extending direction of the plurality cells of the honeycomb structure portion a first straight line defining a circumferential length of the honeycomb structure portion is dra n so as to connect a center point of each electrode portion of the pair of electrode rrortions,
(2) using the first straight line L as a center, second straight lines are drawn so as to form a central angle of 5° on each of a left side and a right side of the first straight line L to define regions of the honeycomb structure portion,
(3) each region of the regions up to a length of ⅕ L the outer peripheral wall is defined as the end regions, and the portion excluding the end regions is defined as the central region.

2. The honeycomb structure according to claim 1, wherein the average electrical resistivity A and the average electric resistivity B satisfy a relationship: ⅕≤A/B≤⅘.

3. The honeycomb structure according to claim 1, wherein the honeycomb structure portion is mainly based on a silicon-silicon carbide composite material or silicon carbide.

4. The honeycomb structure according to claim 1, wherein the honeycomb structure portion has an electric resistivity of from 0.1 to 100 Ωcm and each electrode portion of the pair of electrode portions has an electric resistivity of from 0.001 to 1.0 Ωcm.

5. The honeycomb structure according to claim 1, wherein each of the electrode portions has a central angle of from 60 to 120°.

* * * * *